(12) United States Patent
Ito

(10) Patent No.: US 11,075,815 B2
(45) Date of Patent: Jul. 27, 2021

(54) NETWORK BUILDING APPARATUS, NETWORK BUILDING METHOD, NON-TRANSITORY COMPUTER READABLE MEDIUM STORING PROGRAM

(71) Applicant: NEC Corporation, Tokyo (JP)

(72) Inventor: Tatsuya Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/490,682

(22) PCT Filed: Dec. 20, 2017

(86) PCT No.: PCT/JP2017/045785
§ 371 (c)(1),
(2) Date: Sep. 3, 2019

(87) PCT Pub. No.: WO2018/179627
PCT Pub. Date: Oct. 4, 2018

(65) Prior Publication Data
US 2020/0007407 A1 Jan. 2, 2020

(30) Foreign Application Priority Data
Mar. 31, 2017 (JP) .............................. JP2017-070503

(51) Int. Cl.
*H04L 12/46* (2006.01)
*H04L 12/24* (2006.01)

(52) U.S. Cl.
CPC ........ *H04L 41/145* (2013.01); *H04L 12/4641* (2013.01); *H04L 41/085* (2013.01);
(Continued)

(58) Field of Classification Search
CPC ..... H04L 12/00; H04L 12/46; H04L 12/4641; H04L 41/00; H04L 41/04;
(Continued)

(56) References Cited

U.S. PATENT DOCUMENTS 6,014,697 A * 1/2000 Lewis .................... H04L 41/12
703/14
7,555,421 B1 * 6/2009 Beckett ............... G06F 9/45537
703/23
(Continued)

FOREIGN PATENT DOCUMENTS

| EP | 1 455 483 A2 | 9/2004 |
| JP | 07-287572 A | 10/1995 |

(Continued)

OTHER PUBLICATIONS

Dignan, "Cisco Launches multi-vendor network modling platform", ZDNet (Year: 2014).*
(Continued)

*Primary Examiner* — Boris D Grijalva Lobos
(74) *Attorney, Agent, or Firm* — Sughrue Mion, PLLC

(57) ABSTRACT

A network building apparatus (2) includes a collection unit (11) configured to scan each node connected to a network and collect environmental data of the network, a design unit (21) configured to design a virtual network obtained by virtualizing the network based on the environmental data collected by the collection unit (11), and an output unit (31) configured to output design data of the virtual network designed by the design unit (21).

5 Claims, 5 Drawing Sheets

(52) U.S. Cl.
CPC ...... *H04L 41/0806* (2013.01); *H04L 41/0853* (2013.01); *H04L 41/12* (2013.01)

(58) Field of Classification Search
CPC ........... H04L 41/08–0859; H04L 41/12; H04L 41/14; H04L 41/145; H04L 43/00; H04L 43/10
See application file for complete search history.

(56) References Cited

U.S. PATENT DOCUMENTS

| | | | | |
|---|---|---|---|---|
| 7,729,287 | B2* | 6/2010 | Griffiths | H04L 41/145 370/254 |
| 8,458,314 | B1* | 6/2013 | Andrus | G06Q 10/06 709/223 |
| 9,467,393 | B2* | 10/2016 | Cimprich | G06F 9/5072 |
| 9,697,172 | B1* | 7/2017 | Somohano | G06F 15/177 |
| 10,560,370 | B1* | 2/2020 | A | H04L 47/746 |
| 10,678,746 | B2* | 6/2020 | Somohano | H04L 41/12 |
| 10,749,857 | B2* | 8/2020 | Junio | H04L 63/1433 |
| 2004/0193729 | A1* | 9/2004 | Saraph | H04L 45/12 709/241 |
| 2004/0233234 | A1* | 11/2004 | Chaudhry | H04L 41/22 715/735 |
| 2006/0069805 | A1* | 3/2006 | LeBlanc | H04L 63/10 709/245 |
| 2008/0043627 | A1* | 2/2008 | Singh | H04W 24/06 370/241 |
| 2008/0123586 | A1* | 5/2008 | Manser | H04L 63/30 370/328 |
| 2009/0319247 | A1* | 12/2009 | Ratcliffe, III | H04L 63/1433 703/13 |
| 2011/0093251 | A1* | 4/2011 | Belgaied | H04L 41/145 703/13 |
| 2013/0290955 | A1* | 10/2013 | Turner | H04L 41/12 718/1 |
| 2014/0365196 | A1* | 12/2014 | Melander | G06F 9/455 703/13 |
| 2016/0191501 | A1* | 6/2016 | Li | H04L 67/34 726/6 |
| 2016/0254964 | A1* | 9/2016 | Bene | H04L 41/0853 709/223 |

FOREIGN PATENT DOCUMENTS

| | | |
|---|---|---|
| JP | 2008-165688 A | 7/2008 |
| JP | 2015-156548 A | 8/2015 |

OTHER PUBLICATIONS

International Search Report of PCT/JP2017/045785 dated Mar. 20, 2018.

\* cited by examiner

| ROLE | OS | version | IP Address |
|---|---|---|---|
| Apache | ubuntu | 2.4.23 | 192.168.1.20 |
| OpenSSH | ubuntu | 6.6.1-p1 | 192.168.1.21 |

| ROLE | Order | type |
|---|---|---|
| Win7-PC1 | 3 | VM |
| Win2016-SC | 2 | VM |
| CISCO | 1 | SW |

Fig. 3

| VLAN ID | state |
|---|---|
| 100 | IN USE |
| 101 | NOT IN USE |
| 102 | NOT IN USE |
| 103 | IN USE |
| 104 | IN USE |
| 105 | NOT IN USE |

Fig. 4

| ROLE | install command | OS | version |
|---|---|---|---|
| Apache | apt-get install apache2 | ubuntu | 2.4.23 |
| OpenSSH | apt-get install bind9 | ubuntu | 9.9.9-p5 |

NETWORK BUILDING APPARATUS, NETWORK BUILDING METHOD, NON-TRANSITORY COMPUTER READABLE MEDIUM STORING PROGRAM

CROSS REFERENCE TO RELATED APPLICATIONS

This application is a National Stage of International Application No. PCT/JP2017/045785 filed Dec. 20, 2017, claiming priority based on Japanese Patent Application No. 2017-070503 filed Mar. 31, 2017, the entire contents of which are hereby incorporated by reference.

TECHNICAL FIELD

The present disclosure relates to a network building apparatus, a network building method, and a program.

BACKGROUND ART

In order to evaluate a client's network environment, a network the same as that of the client is preferably built. However, when a network is built manually, a procedure for building the network becomes complicated and requires enormous number of steps, thereby taking a lot of time.

In order to address this issue, recently, a technique of building a virtual network obtained by virtualizing a network for the purpose of reducing the time and cost involved in building the network has been suggested (see Patent Literature 1).

However, in order to build the virtual network obtained by virtualizing the network, it is necessary to collect environmental data of this network. One example of the technique for collecting the environmental data of the network is a technique for collecting the environmental data of the network by monitoring packets transmitted from nodes connected to the network (see Patent Literature 2).

CITATION LIST

Patent Literature

Patent Literature 1: European Patent Application Publication No. 1455483
Patent Literature 2: Japanese Unexamined Patent Application Publication No. H07-287572

SUMMARY OF INVENTION

Technical Problem

Incidentally, in order to build a virtual network obtained by virtualizing a network, data and so on of an OS (Operating System) used by each node connected to this network will also become necessary as the environmental data of this network.

However, as in Patent Literature 2, there is a problem that only a limited items of environmental data can be collected by monitoring the packets transmitted from the nodes connected to the network. For example, in Patent Literature 2, the only environmental data collected by monitoring the packets is a node number included in the packet.

In light of the above problem, an object of the present disclosure is to provide a network building apparatus, a network building method, and a program capable of easily collecting environmental data necessary for building a virtual network.

Solution to Problem

In an example aspect, a network building apparatus includes:
a collection unit configured to scan each node connected to a network and collect environmental data of the network;
a design unit configured to design a virtual network obtained by virtualizing the network based on the environmental data collected by the collection unit; and
an output unit configured to output design data of the virtual network designed by the design unit.

In another example aspect, a network building method performed by a network building apparatus includes:
a collection step of scanning each node connected to a network and collecting environmental data of the network;
a designing step of designing a virtual network obtained by virtualizing the network based on the environmental data collected in the collection step; and
an outputting step of outputting design data of the virtual network designed in the designing step.

In another example aspect, a program causes a computer to execute:
a collection procedure for scanning each node connected to a network and collecting environmental data of the network;
a designing procedure for designing a virtual network obtained by virtualizing the network based on the environmental data collected in the collection procedure; and
an outputting procedure for outputting design data of the virtual network designed in the designing procedure.

Advantageous Effects of Invention

According to the above example aspects, it is possible to achieve an effect of easily collecting environmental data necessary for building a virtual network.

BRIEF DESCRIPTION OF DRAWINGS

FIG. 3 is a diagram showing an example of design rules registered in a design rule DB shown in FIG. 1;
FIG. 4 is a diagram showing an example of constraint rules registered in the constraint rule DB shown in FIG. 1.

DESCRIPTION OF EMBODIMENTS

Hereinafter, an embodiment of the present disclosure will be described with reference to the drawings.

Figures 1, 2:
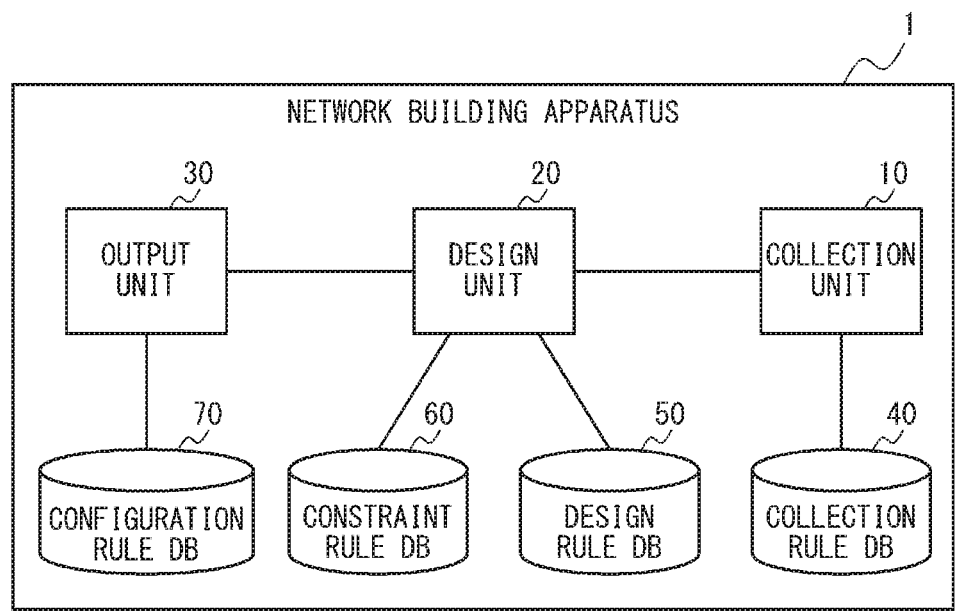
FIG. 1 is a diagram showing a configuration example of a network building apparatus according to an embodiment of the present disclosure.
FIG. 2 is a diagram showing an example of environmental data collected by a collection unit shown in FIG. 1.

First, a configuration of the network building apparatus 1 according to this embodiment will be described with reference to FIG. 1. FIG. 1 is a diagram showing a configuration example of the network building apparatus 1 according to this embodiment. The network building apparatus 1 is used to build a virtual network which is obtained by virtualizing a target network. The network building apparatus 1 includes a collection unit 10, a design unit 20, an output unit 30, a collection rule DB (i.e., database, which will be applied in the following descriptions) 40, a design rule DB 50, a constraint rule DB 60, and a configuration rule DB 70. The collection rule DB 40, the design rule DB 50, the constraint rule DB 60, and the configuration rule DB 70 are not limited to being provided inside the network building apparatus 1 and may instead be provided outside the network building apparatus 1.

The collection unit 10 scans each node connected to the target network in accordance with collection rules registered in the collection rule DB 40 and collects environmental data of the network. Specifically, the collection unit 10 collects the environmental data by executing a port scan on each node. The nodes are client PCs (Personal Computers), hubs, switches, routers, etc. connected to the target network.

The collection rule defines, for example, items of the environmental data to be collected. FIG. 2 is a diagram showing an example of the environmental data collected by the collection unit 10. The items of the environmental data shown in FIG. 2 are a role of the node ("role" in the diagram), an OS used by the node ("OS" in the diagram), a version of the node ("version" in the diagram), and an IP (Internet Protocol) address ("IP Address" in the diagram) of the node. The collection unit 10 scans, for example, each node connected to the target network, and collects data of the items defined in the collection rule as the environmental data of the network.

The design unit 20 designs the virtual network obtained by virtualizing the target network based on the environmental data collected by the collection unit 10 in accordance with design rules registered in the design rule DB 50 and constraint rules registered in the constraint rule DB 60. The design rule DB 50 is an example of a first database, and the design rule is an example of a first rule. The constraint rule DB 60 is an example of a third database, and the constraint rule is an example of a third rule.

The design rule defines an order in which the node is placed in the virtual network, a device type, and so on. FIG. 3 is a diagram showing an example of the design rules registered in the design rule DB 50. The design rule shown in FIG. 3 defines, for each role of the node, the order ("Order" in the diagram) in which the corresponding node having the role is placed in the virtual network and the device type ("Type" in the diagram). The design unit 20 determines that the device type of, for example, the node having the role of "CISCO" when this node is placed in the virtual network is a virtual switch ("SW") in accordance with the design rule shown in FIG. 3 and then places this node first in the virtual network as a virtual switch.

The constraint rule defines a usage status and so on of a resource in the virtual network. The resource is, for example, a VLAN (Virtual Local Area Network), a memory, or the like. In this embodiment, a plurality of virtual networks can be operated at the same time by using a plurality of VLANs. FIG. 4 is a diagram showing an example of the constraint rules registered in the constraint rule DB 60. The constraint rule shown in FIG. 4 defines a usage status of the VLANs in the virtual network (i.e., virtual network #1). When two virtual networks #1 and #2 are designed, the design unit 20 assigns, in accordance with the constraint rules shown in FIG. 4, the VLAN not used by the virtual network #1 to the virtual network #2 so that the VLANs do not overlap of the two virtual networks #1 and #2 do not overlap each other. Note that although the constraint rules shown in FIG. 4 define the usage statuses of the VLANs in the virtual network #1, each of the constraint rules indicates, for each virtual network, the usage status of each type of the resource (VLAN or memory) in the corresponding virtual network. For example, when there are two virtual networks #1 and #2 and there are two types of resources to be managed (VLAN and memory), the constraint rules indicate the usage status of the VLAN in the virtual network #1, the usage status of the memory in the virtual network #1, the usage status of the VLAN in the virtual network #2, and the usage status of the memory in the virtual network #2.

Figure 5:
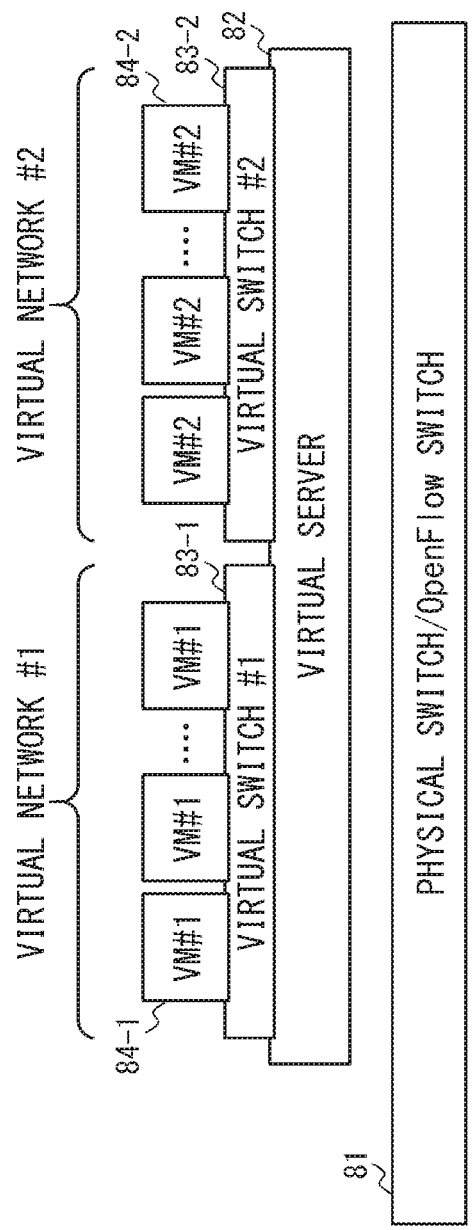
FIG. 5 is a diagram showing an operation example of a design unit shown in FIG. 1.

An operation of the design unit 20 according to this embodiment will be described with reference to FIG. 5. FIG. 5 is a diagram showing an operation example of the design unit 20. Here, an example in which the two virtual networks #1 and #2 are designed in accordance with the design rules shown in FIG. 3 will be described. One type of the resources, namely VLAN, shall be managed.

Firstly, the design unit 20 designs the virtual network #1. To begin with, the design unit 20 determines, in accordance with the design rules shown in FIG. 3, regarding the node having the order ("Order" in the diagram) of "1" and the role of "CISCO" among the nodes connected to the network to be designed as the virtual network #1, that the device type of this node is a virtual switch ("SW") and connects this node to a virtual server 82 as a virtual switch (#1) 83-1. Next, the design unit 20 connects the node having the order ("Order" in the diagram) of "2" and the role of "Win2016-SC" to the virtual switch (#1) 83-1 as a Virtual Machine (VM) (#1) 84-1. Next, the design unit 20 connects the node having the order ("Order" in the diagram) of "3" and the role of "Win7-PC1" to the virtual switch (#1) 83-1 as another VM (#1) 84-1. In this way, the design unit 20 designs the virtual network #1 composed of the virtual switch (#1) 83-1 and the plurality of virtual machines (#1) 84-1. Further, the design unit 20 assigns VLANs to the virtual network #1 and registers, in the constraint rule DB 60, the constraint rules that define the usage statuses of the VLANs in the virtual network #1. Suppose that the constraint rules registered here are the constraint rules shown in FIG. 4 and will be described below.

Next, the design unit 20 designs the virtual network #2 composed of a virtual switch (#2) 83-2 and a plurality of virtual machines (#2) 84-2 in the manner similar to the virtual network #1. At this time, the design unit 20 assigns, in accordance with the constraint rules shown in FIG. 4, the VLANs (the VLANs having "VLAN ID" of "101", "102", and "105"), which are not used in the virtual network #1 to the virtual network #2 so that the VLANs of the two virtual networks #1 and #2 do not overlap each other. Further, the design unit 20 registers, in the constraint rule DB 60, the constraint rules that define the usage statuses of the VLANs in the virtual network #2.

Although not shown in FIG. 5, the design unit 20 connects the virtual switch (#1) 83-1 and the virtual switch (#2) 83-2 to a physical switch/OpenFlow switch 81.

The output unit 30 outputs design data of the virtual network designed by the design unit 20 to a specific output destination. The output destination of the design data is an evaluation environment in an evaluation device (not shown) which evaluates a network designed as a virtual network.

Moreover, when the design data of the virtual network is output, the output unit 30 also outputs information about an installation procedure for an application in each node connected to the network designed as the virtual network in accordance with the configuration rules registered in the configuration rule DB 70. The configuration rule DB 70 is an example of a second database, and the configuration rule is an example of a second rule.

Figures 6, 7:
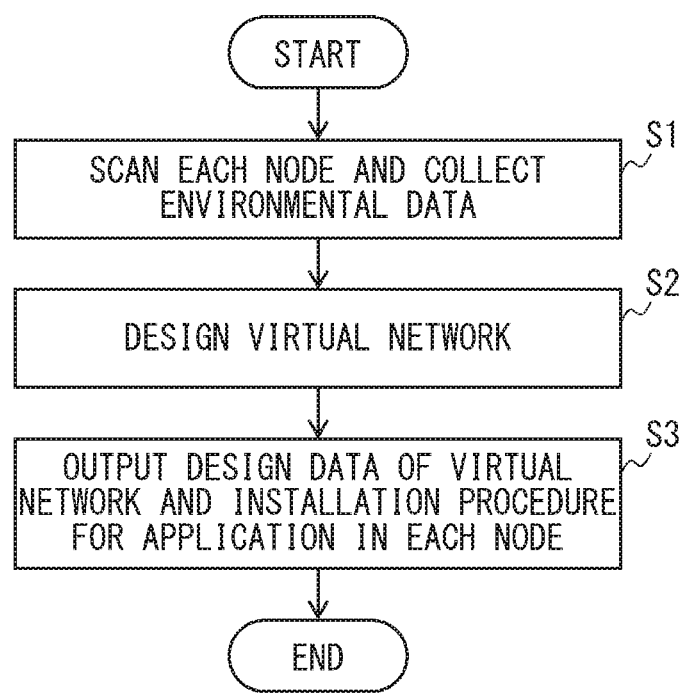
FIG. 6 is a diagram showing an example of configuration rules registered in a configuration rule DB shown in FIG. 1.
FIG. 7 is a flowchart showing an example of a processing flow of the network building apparatus shown in FIG. 1.

The configuration rules define the installation procedures for applications. FIG. 6 is a diagram showing an example of the configuration rules registered in the configuration rule DB 70. Each of the configuration rules shown in FIG. 6 defines, for each role ("role" in the diagram) of the node, an install command ("install command" in the diagram) for installing an application in the node having the corresponding role, an OS ("OS" in the diagram) used by the node having the corresponding role, and a version ("version" in the diagram) of the node having the corresponding role. Although the install commands are defined as the information about the installation procedures for the applications in FIG. 6, the present disclosure is not limited to this, and the configuration rule may be different type of information as long as the installation procedure can be obtained. In regard to the node having the role of, for example, "Apache", the output unit 30 determines that the install command is "apt-get install apache2" in accordance with the configuration rules shown in FIG. 6 and outputs the install command "apt-get install apache2" to the evaluation device. When the install command "apt-get install apache2" is output, it is preferable that information indicating that the node is associated with a virtual machine corresponding to the node having the role of "Apache" also be output.

By doing so, the evaluation device (or an evaluator operating the evaluation device) can install the application in the virtual machine without studying the application to be installed in the virtual machine constituting the virtual network and the installation procedure for the application.

Next, a processing flow of the network building apparatus 1 according to this embodiment will be described with reference to FIG. 7. FIG. 7 is a flowchart showing an example of the processing flow of the network building apparatus 1 according to this embodiment.

First, the collection unit 10 scans each node connected to the target network, and collects the environmental data of the network in accordance with the collection rules registered in the collection rule DB 40 (Step S1).

Next, the design unit 20 designs the virtual network obtained by virtualizing the target network based on the environmental data collected by the collection unit 10 in accordance with the design rules registered in the design rule DB 50 and the constraint rules registered in the constraint rule DB 60 (Step S2).

After that, the output unit 30 outputs the design data of the virtual network designed by the design unit 20 in accordance with the configuration rules registered in the configuration rule DB 70, and the information indicating the installation procedure for an application in each node connected to the network designed as the virtual network (Step S3).

As described above, in the network building apparatus 1 according to this embodiment, the collection unit 10 scans each node connected to the target network to collect the environmental data of the network. This makes it possible to easily collect the environmental data necessary for building the virtual network, such as the role of each node, data of the OS, and so on.

Further, the configuration rule DB 70 registers, for each role of the node, the configuration rule indicating the installation procedure for an application in the node having the role. When the design data of the virtual network is output, the output unit 30 also outputs information about the installation procedure for an application in each node connected to the network designed as the virtual network in accordance with the configuration rules registered in the configuration rule DB 70. By doing so, the evaluation device of the output destination (or an evaluator operating the evaluation device) can install the application in the virtual machine without studying the application to be installed in the virtual machine constituting the virtual network and the installation procedure for the application.

Figure 8:
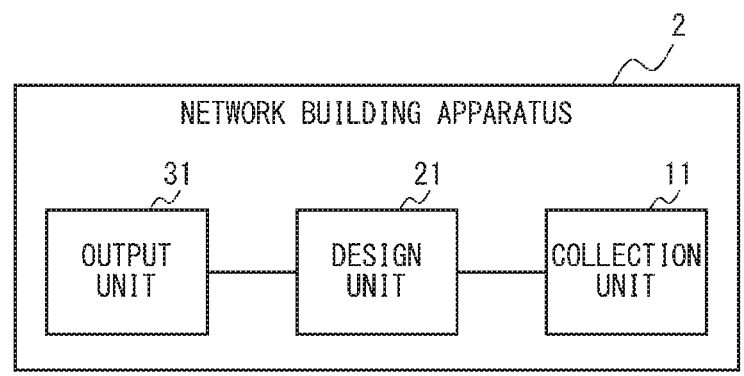
FIG. 8 is a diagram showing a configuration example of a network building apparatus according to the present disclosure.

Hereinafter, an outline of the network building apparatus according to the present disclosure will be described with reference to FIG. 8. FIG. 8 is a diagram showing a configuration example of a network building apparatus 2 according to the present disclosure. The network building apparatus 2 includes a collection unit 11, a design unit 21, and an output unit 31.

The collection unit 11 scans each node connected to the target network to collect environmental data of the network. The collection unit 11 corresponds to the collection unit 10.

The design unit 21 designs a virtual network obtained by virtualizing the target network based on the environmental data collected by the collection unit 11. The design unit 21 corresponds to the design unit 20.

The output unit 31 outputs design data of the virtual network designed by the design unit 20. The output unit 31 corresponds to the output unit 30.

As described above, in the network building apparatus 2 according to the present disclosure, the collection unit 11 scans each node connected to the target network to collect the environmental data of the network. This makes it possible to easily collect the environmental data necessary for building the virtual network.

Although the present disclosure has been described in terms of various viewpoints with reference to the embodiment, the present disclosure is not limited by the above. Various modifications that can be understood by those skilled in the art within the scope of the present disclosure can be made to the configurations and details in each aspect of the present disclosure.

For example, in the above embodiment, each functional block (collection unit, design unit, and output unit) is provided in the same device, but the present disclosure is not limited to this. These functional blocks may be provided in separate devices and connected to each other by a wire or wirelessly.

Each functional block in the above embodiment may be configured by hardware or software or both hardware and software, may be configured by one piece of hardware or software, or may be configured by a plurality of pieces of hardware or software. The function (processing) of each device may be implemented by a computer including a CPU (Central Processing Unit), a memory, and so on. For example, the function (processing) of each device may be implemented by storing, in a memory, a program for carrying out the network building method according to the embodiment and causing the CPU to execute the program stored in a memory.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media, CD-ROM (compact disc read only memory), CD-R (compact disc-recordable), CD-R/W (compact disc-rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves.

Transitory computer readable media can provide the program to a computer via a wired communication line (e.g. electric wires, and optical fibers) or a wireless communication line.

For example, the whole or part of the embodiments disclosed above can be described as, but not limited to, the following supplementary notes.

(Supplementary Note 1)

A network building apparatus comprising:

a collection unit configured to scan each node connected to a network and collect environmental data of the network;

a design unit configured to design a virtual network obtained by virtualizing the network based on the environmental data collected by the collection unit; and an output unit configured to output design data of the virtual network designed by the design unit.

(Supplementary Note 2)

The network building apparatus according to Supplementary note 1, wherein for each role of the node, a first rule indicating a device type when the node having the role is placed in the virtual network is stored in a first database, the collection unit collects at least data indicating the role of each node connected to the network as the environmental data of the network, and the design unit determines the device type corresponding to the role of each node connected to the network in accordance with the first rule, and the design unit places each node connected to the network in the virtual network as a device of the determined device type.

(Supplementary Note 3)

The network building apparatus according to Supplementary note 2, wherein for each role of the node, a second rule indicating an installation procedure for an application in the node having the role is stored in a second database, the output unit determines the installation procedure corresponding to the role of each node connected to the network in accordance with the second rule, and the output unit, when it outputs the design data of the virtual network, also outputs information about the installation procedure in each node connected to the network.

(Supplementary Note 4)

The network building apparatus according to any one of Supplementary notes 1 to 3, wherein for each virtual network, a third rule indicating a usage status of a resource in the virtual network is stored in a third database, the design unit, when designing a plurality of the virtual networks, assigns a resource to each of the plurality of the virtual networks in accordance with the third rule in such a way that the resources of the plurality of the virtual networks do not overlap each other.

(Supplementary Note 5)

A network building method performed by a network building apparatus comprising:

a collection step of scanning each node connected to a network and collecting environmental data of the network;

a designing step of designing a virtual network obtained by virtualizing the network based on the environmental data collected in the collection step; and an outputting step of outputting design data of the virtual network designed in the designing step.

(Supplementary Note 6)

The network building method according to Supplementary note 5, wherein for each role of the node, a first rule indicating a device type when the node having the role is placed in the virtual network is stored in a first database, in the collection step, at least data indicating the role of each node connected to the network is collected as the environmental data of the network, and in the designing step, the device type corresponding to the role of each node connected to the network is determined in accordance with the first rule, and in the designing step, each node connected to the network is placed in the virtual network as a device of the determined device type.

(Supplementary Note 7)

The network building method according to Supplementary note 6, wherein for each role of the node, a second rule indicating an installation procedure for an application in the node having the role is stored in a second database, in the outputting step, the installation procedure corresponding to the role of each node connected to the network is determined in accordance with the second rule, and in the outputting step, information about the installation procedure in each node connected to the network is also output when the design data of the virtual network is output.

(Supplementary Note 8)

The network building method according to any one of Supplementary notes 5 to 7, wherein for each virtual network, a third rule indicating a usage status of a resource in the virtual network is stored in a third database, in the designing step, when a plurality of the virtual networks are designed, a resource is assigned to each of the plurality of the virtual networks in accordance with the third rule in such a way that the resources of the plurality of the virtual networks do not overlap each other.

(Supplementary Note 9)

A program causing a computer to execute:

a collection procedure for scanning each node connected to a network and collecting environmental data of the network;

a designing procedure for designing a virtual network obtained by virtualizing the network based on the environmental data collected in the collection procedure; and an outputting procedure for outputting design data of the virtual network designed in the designing procedure.

(Supplementary Note 10)

The program according to Supplementary note 9, wherein for each role of the node, a first rule indicating a device type when the node having the role is placed in the virtual network is stored in a first database, in the collection procedure, at least data indicating the role of each node connected to the network is collected as the environmental data of the network, and in the designing procedure, the device type corresponding to the role of each node connected to the network is determined in accordance with the first rule, and in the designing procedure, each node connected to the network is placed in the virtual network as a device of the determined device type.

(Supplementary Note 11)

The program according to Supplementary note 10, wherein for each role of the node, a second rule indicating an installation procedure for an application in the node having the role is stored in a second database, in the outputting procedure, the installation procedure corresponding to the role of each node connected to the network is determined in accordance with the second rule, and in the outputting procedure, information about the installation procedure in each node connected to the network is also output when the design data of the virtual network is output.

(Supplementary Note 12)

The program according to any one of Supplementary notes 9 to 11, wherein for each virtual network, a third rule indicating a usage status of a resource in the virtual network is stored in a third database, in the designing procedure, when a plurality of the virtual networks are designed, a resource is assigned to each of the plurality of the virtual networks in accordance with the third rule in such a way that the resources of the plurality of the virtual networks do not overlap each other.

REFERENCE SIGNS LIST

1 NETWORK BUILDING APPARATUS
10 COLLECTION UNIT
20 DESIGN UNIT
30 OUTPUT UNIT
40 COLLECTION RULE DB
50 DESIGN RULE DB
60 CONSTRAINT RULE DB
70 CONFIGURATION RULE DB
2 NETWORK BUILDING APPARATUS
11 COLLECTION UNIT
21 DESIGN UNIT
31 OUTPUT UNIT

The invention claimed is:

1. A network building apparatus comprising:
at least one processor configured to implement:
a collection unit configured to scan each node connected to a network and collect environmental data of the network;
a design unit configured to design a virtual network obtained by virtualizing the network based on the environmental data collected by the collection unit; and
an output unit configured to output design data of the virtual network designed by the design unit,
wherein for each role of each node connected to the network, a first rule indicating a device type when a corresponding node having a corresponding role is placed in the virtual network is stored in a first database,
the collection unit collects at least data indicating the corresponding role of each node connected to the network as the environmental data of the network,
the design unit determines the device type corresponding to the corresponding role of each node connected to the network in accordance with the first rule,
the design unit places each node connected to the network in the virtual network as a device of the determined device type,
the virtual network is one from among a plurality of virtual networks,
for each of the plurality of virtual networks, a third rule indicating a usage status of a resource that comprises a VLAN and a memory in a corresponding virtual network is stored in a third database, and
the design unit, when designing the plurality of virtual networks, assigns the resource to each of the plurality of virtual networks in accordance with the third rule in such a way that resources of the plurality of virtual networks do not overlap each other.

2. The network building apparatus according to claim 1, wherein
for each role of each node connected to the network, a second rule indicating an installation procedure for an application in the corresponding node having the corresponding role is stored in a second database,
the output unit determines the installation procedure corresponding to the corresponding role of each node connected to the network in accordance with the second rule, and
the output unit, when it outputs the design data of the virtual network, also outputs information about the installation procedure in each node connected to the network.

3. A network building method performed by a network building apparatus comprising:
collecting environmental data by scanning each node connected to a network;
designing a virtual network obtained by virtualizing the network based on the environmental data collected in the collecting; and
outputting design data of the virtual network designed in the designing,
wherein for each role of each node connected to the network, a first rule indicating a device type when a corresponding node having a corresponding role is placed in the virtual network is stored in a first database,
the collecting comprises collecting data indicating the corresponding role of each node connected to the network as the environmental data of the network,
the designing comprises determining the device type corresponding to the corresponding role of each node connected to the network in accordance with the first rule,
the designing comprises placing each node connected to the network in the virtual network as a device of the determined device type,
the virtual network is one from among a plurality of virtual networks,
for each of the plurality of virtual networks, a third rule indicating a usage status of a resource that comprises a VLAN and a memory in a corresponding virtual network is stored in a third database, and
in the designing, when the plurality of virtual networks are designed, a resource is assigned to each of the plurality of virtual networks in accordance with the third rule in such a way that resources of the plurality of virtual networks do not overlap each other.

4. The network building method according to claim 3, wherein
for each role of each node connected to the network, a second rule indicating an installation procedure for an application in the corresponding node having the corresponding role is stored in a second database, in the outputting, the installation procedure corresponding to the corresponding role of each node connected to the network is determined in accordance with the second rule, and in the outputting, information about the installation procedure in each node connected to the network is also output when the design data of the virtual network is output.

5. A non-transitory computer readable medium storing a program causing a computer to execute:

a collection procedure for scanning each node connected to a network and collecting environmental data of the network;

a designing procedure for a virtual network obtained by virtualizing the network based on the environmental data collected in the collection procedure; and an outputting procedure for outputting design data of the virtual network designed in the designing procedure, wherein for each role of each node connected to the network, a first rule indicating a device type when a corresponding node having a corresponding role is placed in the virtual network is stored in a first database, the collection procedure comprises collecting data indicating the corresponding role of each node connected to the network as the environmental data of the network, the designing procedure comprises determining the device type corresponding to the corresponding role of each node connected to the network in accordance with the first rule, the designing procedure comprises placing each node connected to the network in the virtual network as a device of the determined device type, the virtual network is one from among a plurality of virtual networks, for each of the plurality of virtual networks, a third rule indicating a usage status of a resource that comprises a VLAN and a memory in a corresponding virtual network is stored in a third database, and in the designing procedure, when the plurality of virtual networks are designed, a resource is assigned to each of the plurality of virtual networks in accordance with the third rule in such a way that resources of the plurality of virtual networks do not overlap each other.

* * * * *